UNITED STATES PATENT OFFICE

ARTHUR LÜTTRINGHAUS AND FILIP KAČER, OF MANNHEIM, GERMANY, ASSIGNORS TO GENERAL ANILINE WORKS, INC., OF NEW YORK, N. Y., A CORPORATION OF DELAWARE

ANTHRAQUINONE-THIOXANTHONE VAT DYESTUFFS

No Drawing. Application filed March 6, 1928, Serial No. 259,603, and in Germany March 10, 1927.

The present invention relates to improvements in vat dyestuffs series.

We have found that particularly valuable vat dyestuffs of the said series are produced by causing ring formation to take place, by treatment with dehydrating agents, in those ethers of mercapto-anthraquinone-carboxylic acids, which are obtainable by the condensation, for example, of 2 molecular proportions of a 1-chloranthraquinone-2-carboxylic acid with 1 molecular proportion of a 2.6- or 2.7-dimercaptoanthraquinone (which may be obtained, for example, by boiling a 2.6- or 2.7-dichloranthraquinone respectively with alcoholic sodium sulfide or polysulfide), or by the condensation of 2 molecular proportions of a 1-mercaptoanthraquinone-2-carboxylic acid with 1 molecular proportion of a 2.6- or 2.7-tetrazoanthraquinone-sulfate, or by the condensation of 2 molecular proportions of a 1-diazoanthraquinone-2-carboxylic acid with 1 molecular proportion of a 2.6- or 2.7-dimercaptoanthraquinone, and which are therefore bis-(2'-carboxy-anthraquinonyl-1'-)-diamercapto-2.6-, or 2.7-anthraquinones of the general formulæ:

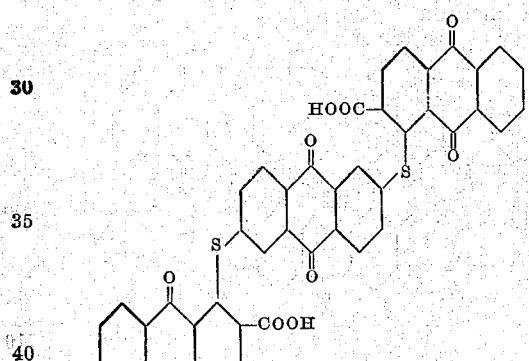

and

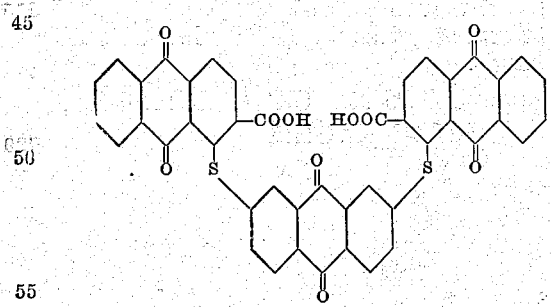

For the performance of the present process also the salts of the said carboxylic acids may be employed, which, therefore, are regarded as equivalents for the said purpose. These dyestuffs, in which 3 anthraquinone radicles are connected with each other in the molecule and which correspond probably to the formulæ

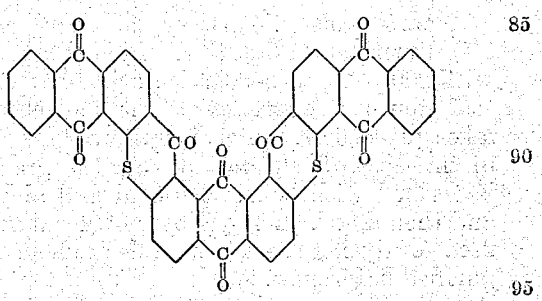

are distinguished from the anthraquinone-thioxanthones hitherto known, by possessing particularly high tinctorial power, and by giving strong yellow shades also from the warm hydrosulfite vat; they are therefore capable of being combined with the majority of the vat dyestuffs well-known on the market as indanthrene dyestuffs. Their properties as regards fastness are excellent.

The following examples will further illustrate how the said invention may be carried out in practice, but the invention is not limited thereto. The parts are by weight.

Example 1

A sulfuric acid solution of 1.2-anthraquinoneisoxazol is prepared from 25 parts of 1-nitro-2-methylanthraquinone, for example by treating the latter with fuming sulfuric acid and running the mixture into cooled, dilute sulfuric acid, and this solution is converted into one of 1-diazoanthraquinone-2-carboxylic acid, for example by adding at about 50° C., nitrosylsulfuric acid and diluting with water while cooling. A solution of 13 parts of 2.7-dimercaptoanthraquinone in 400 parts of water and 60 parts of caustic soda solution of 30° Beaumé is stirred into this solution, which is still strongly acid, at room temperature. Nitrogen is disengaged, and a yellow precipitate of the bis-(2'-carboxyanthraquinonyl-1'-)-dimercapto-2.7-anthraquinone is produced. The mixture is raised to boiling heat and the precipitate filtered off by suction, washed with water and dried.

10 parts of the acid obtained in the above or any other suitable manner, and which may be purified, if necessary, for instance by way of its sodium salt, are heated to 90° centigrade with 100 parts of sulfuric acid of 66° Beaumé for an hour. The yellow-red sulfuric acid solution is stirred into water, the precipitated dyestuff being filtered by suction and washed until neutral. It may be further purified by treatment with sodium hypochlorite solution. It can be obtained in a specially pure state by fractional precipitation from its solution in sulfuric acid. The dyestuff dissolves to a yellow-red solution in sulfuric acid. The hydrosulfite vat is greyish-blue.

Example 2

10 parts of bis-(2'-carboxy-anthraquinonyl-1'-) dimercapto-2.7-anthraquinone are boiled with 200 parts of benzotrichlorid for from 6 to 7 hours. Formation of the acid chlorid takes place first, which is followed by that of the dyestuff. After cooling, the product is washed with benzotrichlorid and alcohol and then dried. The yellow powder may be used for dyeing as such or, if desired, may be purified before use.

If, in the foregoing examples, the 2.7-dimercaptoanthraquinone be replaced by the 2.6-dimercaptoanthraquinone a very similar dyestuff will be obtained.

The ring formation may also be effected by means of other suitable agents, such as other acid halides or acid anhydrides.

What we claim is:

1. As new articles of manufacture the yellow dyestuffs, which correspond probably to the formulae

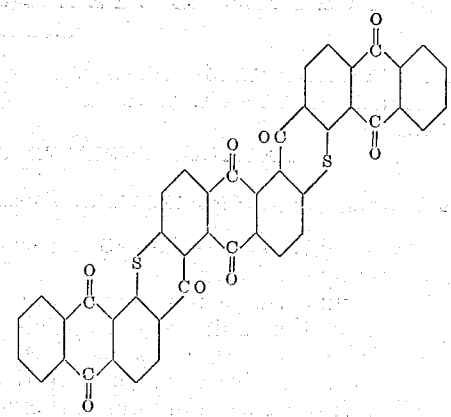

and

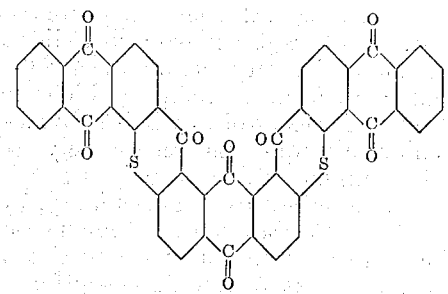

and dye cotton strong yellow shades and are obtainable by treating with a dehydrating agent a bis-(2'-carboxy-anthroquinonyl-1'-) dimercapto-β-anthraquinone in which the two substituted β-positions are not vicinal.

2. As a new article of manufacture the yellow dyestuff which corresponds probably to the formula

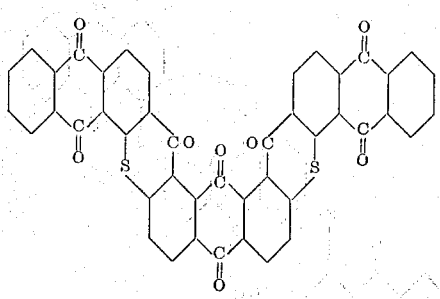

and which dyes cotton strong yellow shades from a greyish-blue hydro-sulfite vat and is obtainable by treating bis-(2'-carboxy-anthraquinonyl-1'-) - dimercapto-2.7-anthraquinone with a dehydrating agent.

In testimony whereof we have hereunto set our hands.

ARTHUR LÜTTRINGHAUS.
FILIP KAČER.